(12) United States Patent
Liu et al.

(10) Patent No.: US 10,855,339 B2
(45) Date of Patent: Dec. 1, 2020

(54) INFORMATION PROCESSING METHOD AND APPARATUS

(71) Applicant: Huawei Technologies Co., Ltd., Shenzhen (CN)

(72) Inventors: Yong Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/268,478

(22) Filed: Feb. 5, 2019

(65) Prior Publication Data
US 2019/0173532 A1 Jun. 6, 2019

Related U.S. Application Data

(63) Continuation of application No. PCT/CN2017/093178, filed on Jul. 17, 2017.

(30) Foreign Application Priority Data

Aug. 10, 2016 (CN) .......................... 2016 1 0653776

(51) Int. Cl.
*H04B 7/02* (2018.01)
*H04B 7/024* (2017.01)
(Continued)

(52) U.S. Cl.
CPC .............. *H04B 7/024* (2013.01); *H04B 7/04* (2013.01); *H04L 5/0035* (2013.01); *H04L 5/0051* (2013.01)

(58) Field of Classification Search
CPC ...... H04B 7/024; H04L 5/0035; H04L 5/0051
(Continued)

(56) References Cited

U.S. PATENT DOCUMENTS

2012/0147773 A1* 6/2012 Kim ..................... H04L 1/0025
370/252
2012/0300670 A1* 11/2012 Sun ..................... H04L 5/0023
370/254
(Continued)

FOREIGN PATENT DOCUMENTS

CN 104247291 A 12/2014
CN 104604166 A 5/2015
(Continued)

OTHER PUBLICATIONS

3GPP TS 36.212 V12.5.0 (Jun. 2015), "3rd Generation Partnership Project; Technical Specification Group Radio Access Network; Evolved Universal Terrestrial Radio Access (E-UTRA); Multiplexing and channel coding (Release 12)", 94 pages.
(Continued)

*Primary Examiner* — Helene E Tayong
(74) *Attorney, Agent, or Firm* — Leydig, Voit & Mayer, Ltd.

(57) ABSTRACT

An information processing method is provided and applied to a multiple-input multiple-output (MIMO) communications system, where a plurality of data demodulation reference signal ports are allocated to UE, and the method includes: obtaining, in a scheduled time-frequency resource, information about whether the plurality of data demodulation reference signal ports allocated to the UE meet a particular port relationship, where meeting the particular port relationship means that signals sent by using any ports experience same or similar large-scale properties; and sending an indication of the information about whether the particular port relationship is met, so that for at least two data demodulation reference signal ports that meet the particular port relationship, the UE performs channel esti-
(Continued)

mation, frequency offset estimation, or demodulation by using same parameters.

19 Claims, 4 Drawing Sheets

(51) Int. Cl.
*H04B 7/04* (2017.01)
*H04L 5/00* (2006.01)

(58) Field of Classification Search
USPC .......................................................... 375/267
See application file for complete search history.

(56) References Cited

U.S. PATENT DOCUMENTS

| | | | |
|---|---|---|---|
| 2015/0201369 A1 | 7/2015 | Ng et al. | |
| 2015/0215908 A1 | 7/2015 | Seo et al. | |
| 2015/0236801 A1 | 8/2015 | Sun et al. | |
| 2015/0289235 A1* | 10/2015 | Park | H04L 5/001 370/329 |
| 2015/0349855 A1* | 12/2015 | Sesia | H04W 24/08 370/252 |
| 2016/0006547 A1 | 1/2016 | Kang et al. | |
| 2016/0050001 A1* | 2/2016 | Kang | H04W 72/0406 370/329 |

FOREIGN PATENT DOCUMENTS

| | | |
|---|---|---|
| CN | 105144612 A | 12/2015 |
| EP | 2654333 A1 | 10/2013 |
| EP | 2905910 A1 | 8/2015 |

OTHER PUBLICATIONS

3GPP TS 36.211 V13.1.0 (Mar. 2016) "3rd Generation Partnership Project; Technical Specification Group Radio Access Network; Evolved Universal Terrestrial Radio Access (E-UTRA); Physical channels and modulation (Release 13)", 155 pages.

3GPP TS 36.213 V11.1.0 (Dec. 2012), "3rd Generation Partnership Project; Technical Specification Group Radio Access Network; Evolved Universal Terrestrial Radio Access (E-UTRA); Physical layer procedures(Release 11)", 160 pages.

* cited by examiner

INFORMATION PROCESSING METHOD AND APPARATUS

CROSS-REFERENCE TO RELATED APPLICATIONS

This application is a continuation of International Application No. PCT/CN2017/093178, filed on Jul. 17, 2017, which claims priority to Chinese Patent Application No. 201610653776.2, filed on Aug. 10, 2016. The disclosures of the aforementioned applications are hereby incorporated by reference in their entireties.

TECHNICAL FIELD

Emobodiments of the present invention relate to the communications field, and more specifically, to an information processing method and apparatus.

BACKGROUND

With rapid development of communications technologies, a modern communications system is mainly characterized by a high speed, a large capacity, and wide coverage, making it appear to be particularly important to resolve non-ideal characteristic problems such as severe fading and interference caused by continuous expansion of a communication range and a more complex and diverse communication environment. In the foregoing interference, inter-cell interference is a relatively severe problem. Because a user located at a cell edge is easily interfered by a neighboring cell, a throughput of the cell edge user is lower than a throughput of a cell center user. This problem has become a bottleneck restricting overall system performance.

SUMMARY

To improve performance of a communications system, implementations of the present invention provide an information processing method, applied to a multiple-input multiple-output (MIMO) communications system, where a plurality of data demodulation reference signal ports are allocated to UE, and the method includes:

obtaining, in a scheduled time-frequency resource, information about whether the plurality of data demodulation reference signal ports allocated to the UE meet a particular port relationship, where meeting the particular port relationship means that signals sent by using any ports experience same or similar large-scale properties; and sending an indication of the information about whether the particular port relationship is met, so that for at least two data demodulation reference signal ports that meet the particular port relationship, the UE performs channel estimation, frequency offset estimation, or demodulation by using same parameters.

Correspondingly, according to another aspect, an information processing method is provided, applied to a multiple-input multiple-output (MIMO) communications system, where a plurality of data demodulation reference signal ports are allocated to UE, and the method includes: obtaining, in a scheduled time-frequency resource, information about whether the plurality of data demodulation reference signal ports allocated to the UE meet a particular port relationship, where meeting the particular port relationship means that signals sent by using any ports experience same or similar large-scale properties; and for at least two data demodulation reference signal ports that meet the particular port relationship, performing, by the UE, channel estimation, frequency offset estimation, or demodulation by using same parameters.

Specifically, according to another aspect, information processing apparatuses that can perform the foregoing methods are provided, including an apparatus located on a UE side and an apparatus located on a network side. These apparatuses include integrated circuits, or UE and a base station, network central nodes, or the like.

DESCRIPTION OF EMBODIMENTS

Figure 1:
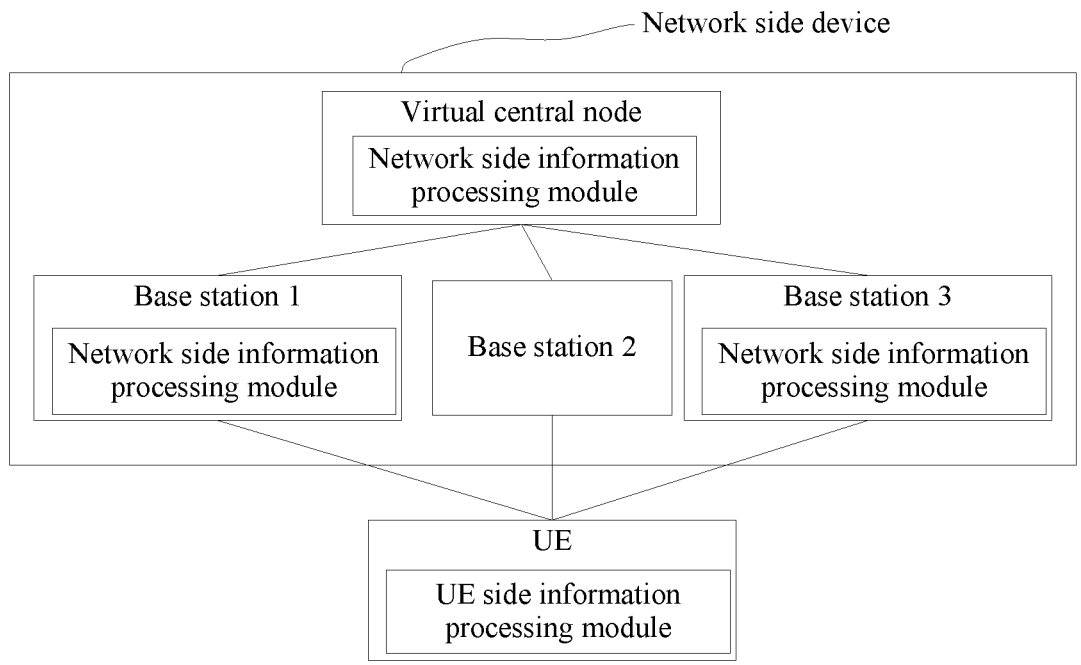
FIG. 1 is a simplified schematic diagram of a system according to an implementation of the present invention.

The following describes in detail features of various aspects and example embodiments of the present invention. Many specific details are provided in the following detailed description, to provide a full understanding of the present invention. However, it is apparent to a person skilled in the art that the present invention may be implemented without some of these details. The following embodiment descriptions are intended only to provide a better understanding of the present invention by using examples of the present invention. The present invention is not limited to any specific configuration and algorithm set forth below, but covers any modification, replacement, and improvement made to an element, a component, and an algorithm without departing from the spirit of the present invention. In the accompanying drawings and the following descriptions, well-known structures and technologies are not shown to avoid unnecessarily obscuring the present invention.

Example implementations are now described more thoroughly with reference to the accompanying drawings. However, the example implementations can be implemented in a plurality of forms and should not be construed as being limited to the implementations described herein. On the contrary, these implementations are provided to make the present invention more comprehensive and complete, and fully convey the ideas of the example implementations to a person skilled in the art. In the figures, thickness of regions and layers may be exaggerated for clarity. A same reference numeral in the drawings denotes a same or similar structure, and therefore detailed descriptions thereof are omitted.

In addition, the described features, structures, or characteristics may be combined in one or more embodiments in any appropriate manner. In the following descriptions, many specific details are described to provide a thorough understanding of the embodiments of the present invention. However, a person skilled in the art may be aware that technical solutions of the present invention may be practiced without one or more of the specific details, or another method, component, material, or the like may be used. In another case, a well-known structure, material, or operation is not shown or described in detail to avoid obscuring the main technical idea of the present invention.

It should be noted that the embodiments in this application and the features in the embodiments may be mutually combined in a case of no conflict. This application is described below in detail with reference to the accompanying drawings by using embodiments.

To improve performance of a communications system, a coordinated multipoint transmission/reception (CoMP) technology is developed in recent years, so that base stations in different cells transmit data in a downlink coordination manner. In a coordinated multipoint transmission/reception process, a coordinated base station needs to transfer channel information of a user to a center processing unit, and the center processing unit implements scheduling and precoding for the user, and transfers scheduling and precoding results to the coordinated base station. However, because a same terminal may be served by a plurality of base stations due to coordinated multipoint transmission/reception, different downlink transmit antenna ports greatly vary in geographic locations, and consequently a plurality of antenna ports related to the terminal vary in large-scale properties. In this case, the terminal uses different related parameters and procedures for channel estimation and demodulation.

To improve channel estimation and data demodulation efficiency of a receive end with reference to a location relationship between channels corresponding to antenna ports, a location relationship status (QCL, Quasi-Co-Located) is defined in 3GPP R11 as that signals sent by using antenna ports of a same base station experience same or similar large-scale properties (based on the QCL assumption, the receive end may use same or similar parameters and processes for channel estimation/data demodulation). However, it is apparent that the foregoing QCL solution cannot be applied to the foregoing coordinated multipoint transmission/reception communications system.

In a demodulation process of a receive end in a communications system, compared with incoherent demodulation, coherent demodulation can implement better performance, and obtain a gain of approximately 3 dB. Therefore, coherent demodulation is more widely used in modern communications systems. However, in an OFDM system, each carrier is suppressed during modulation of the carrier, and the receive end needs reference signals during coherent modulation. The reference signals (Reference Signal, RS), also referred to as pilot signals are distributed on different resource elements (Resource Element) in an OFDM symbol in two-dimensional time-frequency space, and have a known amplitude and phase. Similarly, in a MIMO system, transmit antennas (virtual antennas or physical antennas) have separate data channels, and a receiver performs channel estimation for each transmit antenna, and restores sent data based on a channel estimation result.

Channel estimation is a process of reconstructing a received signal to compensate for fading and noise of a channel, and an RS known to a transmitter and a receiver is used to track changes of the channel in time domain and frequency domain. For example, to implement channel quality measurement and data demodulation of a higher-order multiple-antenna system, a plurality of pilot symbols: a cell-specific reference signal (CRS), a demodulation reference signal (DMRS), and a channel state information-reference signal (CSI-RS) are defined in an LTE-A system. DMRSs are in one-to-one correspondence with physical downlink shared channels (PDSCH) (DMRS-PDSCH mapping for short). The DMRS is used to demodulate a corresponding PDSCH. The CSI-RS is used to report information such as a channel quality indicator (CQI), a precoding matrix indicator (PMI), or a rank indicator (RI). Specifically, the CRS is used to measure downlink channel quality to schedule a resource and support a link adaptation technology, and therefore needs to be sent in all available bands by using all subframes and antenna ports. A same preprocessing manner is used for the DMRS and user data, and characteristics are as follows: (1) The preprocessing manner is UE-specific, to be specific, a same precoding matrix is used for each piece of terminal data and a demodulation reference signal corresponding to the terminal data. (2) From a perspective of a network side, DMRSs transmitted on various layers are orthogonal to each other. (3) The DMRS is usually used to support beamforming and precoding technologies and therefore is sent only on a scheduled resource block, and a quantity of sent DMRSs is proportional to a quantity of data streams instead of a quantity of transmit antennas.

In an existing standard coordinated multipoint transmission/reception scheme, neither JT (Joint Transmission) nor DPS (Dynamic Point Selection) supports a plurality of base stations in sending, in a same time-frequency resource, data of different ports to a same terminal. In other words, in different time-frequency domain scheduling periods, different base stations may provide a service for a same terminal based on scheduling or link adaptation. However, in a same time-frequency resource, the same terminal accepts data transmitted by only one base station. Apparently, this limits further increase in a spatial degree of freedom of coordinated multipoint transmission/reception.

In addition, in a single point transmission system instead of coordinated multipoint transmission/reception, corresponding ports may still not meet the QCL assumption. For example, in a high frequency MIMO system, data from a same transmission point may still experience different large-scale fading channels in different beam directions.

Therefore, in summary, how to configure a location relationship between channels corresponding to data demodulation reference signal ports to fully utilize a spatial degree of freedom to improve spectral efficiency of a transmission system is a problem that urgently needs to be resolved in the MIMO system.

For the foregoing technical challenge, in an implementation of the present invention, referring to FIG. 1, a coordinated multipoint transmission/reception MIMO system is used as an example. In this communications system, each of a plurality of different base stations allocates one or more data demodulation reference signal ports to UE, and on a network side device (for example, a base station, a virtual central node, or another node, not all shown) or a UE side device, an information processing apparatus is included, and can obtain a particular relationship between the plurality of data demodulation reference signal ports allocated to the UE, so that the UE performs flexible estimation and demodulation processing based on the particular relationship. A difference from the prior art includes at least the following: A case in which data demodulation reference signal ports do not meet the foregoing particular port relationship is considered (non-QCL for short), so that it is ensured that more precise channel estimation is performed for the data demodulation reference signal ports, thereby improving data demodulation precision and effectively reducing estimation and demodulation complexity of a UE side. Specifically, for a possible non-QCL state of the plurality of data demodulation reference signal ports, the UE separately uses different estimation and demodulation schemes, for example, channel estimation, delay, and Doppler estimation. In addition, a relative relationship between the ports is notified by using implicit or explicit signaling.

In implementations of the present invention, for MIMO communications systems in various communication scenarios, a concept similar to that of QCL is used, and is simply referred to as a particular port relationship, meaning that when any ports (especially ports of different base stations or access points, or on different antenna panels) meet a particular relationship, signals sent by using these ports experience same or similar large-scale properties. In future standards or other documents, other terms may be used for description. However, functions or meanings of these terms are consistent with those of the "particular port relationship". The large-scale properties include but are not limited to Doppler frequency shift, Doppler spread, maximum delay spread, average delay spread, average power, and the like.

Figure 2:
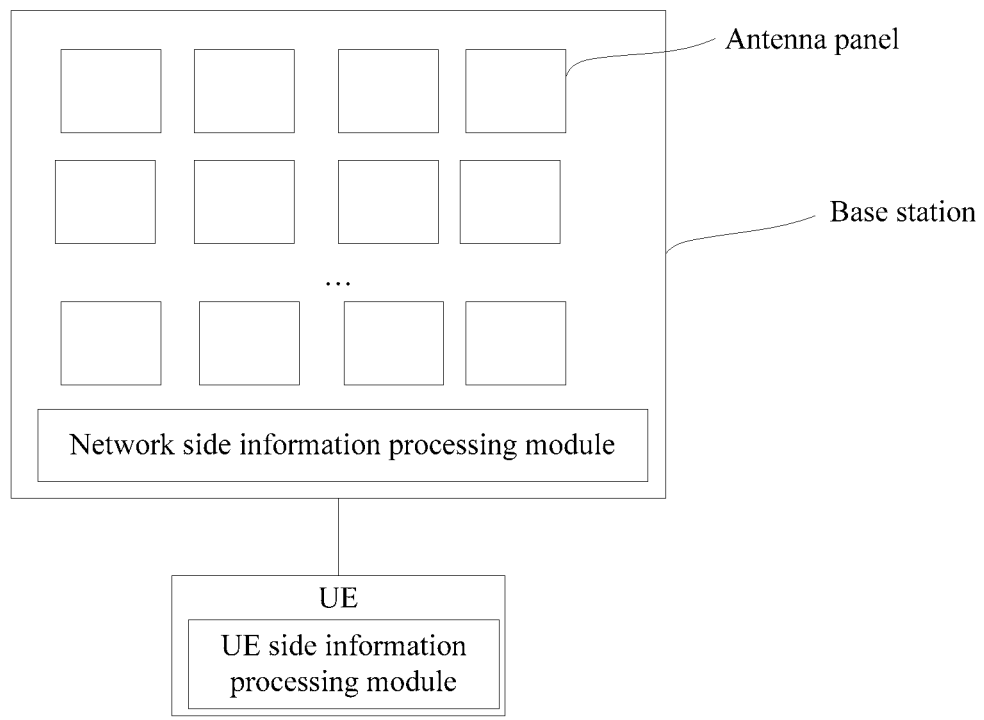
FIG. 2 is a simplified schematic diagram of a system according to another implementation of the present invention.

Referring to FIG. 2, a single point transmission MIMO system is used as an example. In this communications system, a base station includes a plurality of antenna panels, and there are a plurality of antennas on the antenna panel. In the system, a plurality of data demodulation reference signal ports are allocated to UE, and on a network side device (for example, a base station) or a UE side device, an information processing apparatus is included, and can obtain a particular relationship between the plurality of data demodulation reference signal ports allocated to the UE, so that the UE performs flexible estimation and demodulation processing based on the particular relationship.

Figure 3:
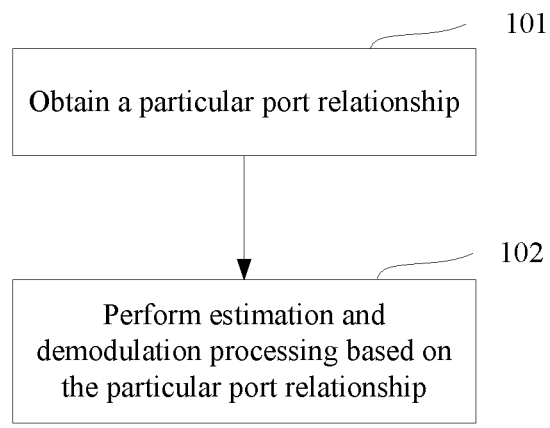
FIG. 3, FIG. 4, FIG. 5, and FIG. 6 each are a simplified schematic flowchart of a method according to an implementation.

Referring to FIG. 3, an information processing method that is in a communications system and that is applied to the foregoing multiple-input multiple-output (MIMO) systems (for example, in FIG. 1 and FIG. 2) is provided, and the method includes the following steps.

101. Obtain, in a scheduled time-frequency resource, information about whether a plurality of data demodulation reference signal ports allocated to UE meet a particular port relationship, in other words, whether a QCL assumption is met. As described above, meeting the particular port relationship means that signals sent by using any two or more ports experience same or similar large-scale properties. Specifically, the particular port relationship may be clearly specified as a relationship between a plurality of ports for which a same channel estimation parameter, frequency offset estimation parameter, or demodulation parameter needs to be used, or may be specified as a relationship between a plurality of co-located ports.

Specifically, the information about whether the particular port relationship is met may be obtained according to a preset rule, or may be obtained by receiving an explicit or implicit indication, or may be obtained through measurement and determining. An execution entity may be a network side device, for example, a base station, a virtual central node, or another network node, or may be UE.

A measurement parameter includes one or any combination of the following parameters: average delay spread, Doppler frequency shift/Doppler spread, and average power. In a measurement process, statistical channel information or instantaneous channel information may be used. It should be noted that a measurement entity and algorithm are not limited in this implementation of the present invention.

Specifically, there may be a plurality of determining algorithms. For example, a parameter difference or ratio of any two data demodulation reference signal ports is calculated, and is then compared with a specified threshold. When the parameter difference or ratio is less than the threshold, or less than or equal to the threshold, it is determined that the two data demodulation reference signal ports meet the particular port relationship, in other words, the QCL assumption is met. For example, when a delay spread difference is less than 50 ns, it may be considered that the QCL assumption is met, or when a frequency shift difference is less than 5 degrees, it is considered that the QCL assumption is met, or when a power difference is less than 0.5 dB, it is considered that the QCL assumption is met. For another example, a threshold may be set to 0.95 to 1.05, and when the ratio falls within the range from 0.95 to 1.05, it may be considered that the QCL assumption is met.

Specifically, the information about whether the plurality of data demodulation reference signal ports meet the particular port relationship may be specifically grouping of the plurality of data demodulation reference signal ports that is performed based on the information about whether the particular port relationship is met. Briefly, the plurality of data demodulation reference signal ports are divided into one or more groups. At least one of the groups includes a plurality of data demodulation reference signal ports, and any two data demodulation reference signal ports in the group meet the particular port relationship (meet the QCL assumption).

Optionally, if the network side device performs detection and determining, in this implementation of the present invention, the method further includes: indicating a relationship between the data demodulation reference signal ports to the UE. For example, the indication to the UE is performed by using explicit or implicit signaling. An indication manner is subsequently described by using specific examples.

102. The UE performs the following method based on a relationship between the plurality of data demodulation reference signal ports: For at least two data demodulation reference signal ports that meet the QCL assumption (QCL data demodulation reference signal ports for short) (these ports may be allocated by one base station, or may be allocated by different base stations to the UE): regardless of whether the data demodulation reference signal ports are allocated by a same base station or different base stations, the UE may perform estimation (channel estimation or frequency offset estimation) by using a same estimation parameter or perform demodulation based on a same demodulation parameter, provided that the QCL assumption is met. For example, for any data demodulation reference signal port in a group meeting the QCL assumption, the UE detects and obtains a channel estimation algorithm and a data demodulation parameter corresponding to the port, and performs channel estimation, frequency offset compensation, or data demodulation based on the obtained parameters; and for another port in the group, the parameters are not repeatedly detected and obtained. During channel estimation and data demodulation, channel estimation is performed by using the obtained channel estimation algorithm parameter (for example, Doppler frequency shift, maximum delay spread, average delay spread, and average power), frequency offset estimation is performed by using a frequency offset estimation parameter (for example, Doppler spread), and/or a data demodulation process is performed by using the data demodulation parameter (for example, average power). Certainly, related parameters are not limited to the parameter examples. In other words, different parameters may be used in different algorithms. Details are not described herein.

For data demodulation reference signal ports that do not meet the QCL assumption (Non-QCL data demodulation reference signal ports for short): the UE separately obtains parameters, and separately performs channel estimation, frequency offset estimation, or demodulation processes by using different parameters.

Specifically, parameters for channel estimation, frequency offset compensation, and demodulation may be different. For example, during MMSE-based Wiener filtering, parameters such as average delay spread (frequency domain filtering), Doppler frequency shift (time domain filtering), and average power are needed. Doppler frequency shift/spread is a parameter required for frequency compensation. The average power is a parameter required for demodulation. Processing processes are also different based on different algorithms. For example, an MMSE-based Wiener filtering channel estimation process is as follows: performing channel estimation for a reference signal location—generating a filtering coefficient by using the average delay spread/Doppler frequency shift—performing channel estimation for a PDSCH data location. For example, an MMSE-based data demodulation process is as follows: generating an MMSE equalization coefficient by using the channel estimation of the PDSCH data location and the average power—performing data demodulation by using the equalization coefficient and received data, to restore sent data.

Certainly, not only parameters are different, but also algorithms for channel estimation, frequency offset estimation, or demodulation processes may be different. For example, a channel estimation algorithm and process are highly related to a channel characteristic. A particularly flat channel (small delay spread) does not need Wiener filtering, and a simple LS+ linear interpolation may be directly used. In this case, certainly, Wiener coefficient calculation and time-frequency domain filtering are not needed. In another example, both an RB bundling size and an average channel granularity during estimation and demodulation processes change with different channel characteristics. Specifically, when a channel is a low frequency selective channel (to be specific, average delay spread is relatively small), the channel changes relatively slowly in frequency domain, or in other words, the channel is relatively flat. Therefore, the channel changes slightly on consecutive RBs, and little error is introduced even though channel averaging over the RBs is performed. On the contrary, a high frequency selective channel may change greatly on very few consecutive subcarriers. In this case, when channel averaging over a relatively large quantity of RBs is performed, a great error is introduced. Benefits of channel averaging lie in a reduction in UE processing complexity, an RB bundling size during channel estimation, and channel averaging before demodulation. In other words, bundling of 5 RBs and channel averaging over the 5 RBs mean that 60 subcarriers need channel estimation and equalization coefficient calculation to be performed only once. Both channel estimation complexity and equalization coefficient calculation complexity are greatly reduced.

For different entities, different indication manners used for a particular relationship between ports are specifically described in the following implementations by using examples.

Implementation 1

Figure 4:
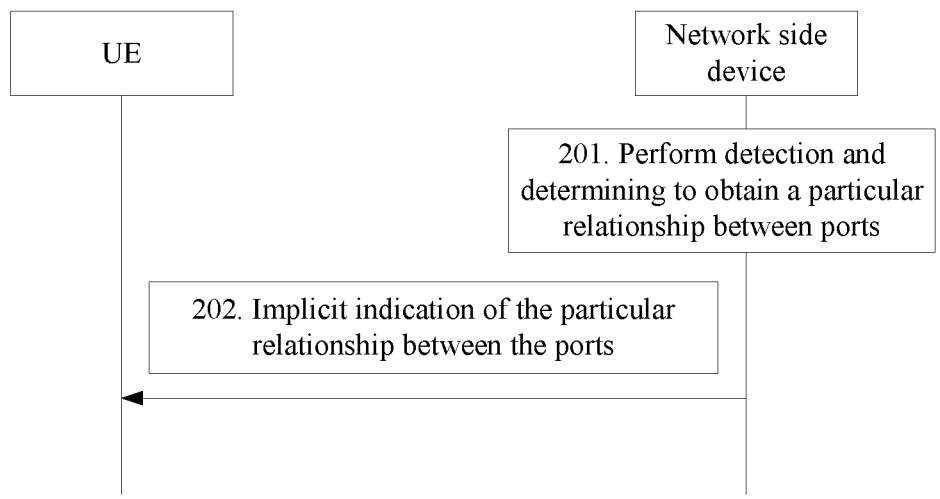

Referring to FIG. 4, in this implementation of the present invention, in a MIMO transmission system, UE obtains information about a relationship between data demodulation reference signal ports based on an explicit signaling indication, and performs channel estimation and data demodulation based on the obtained relationship between the data demodulation reference signal ports. The following steps are included.

201. A network side device (for example, a base station or a virtual central node) performs measurement and determining on a plurality of allocated data demodulation reference signal ports for particular UE in a scheduled time-frequency resource, to obtain a particular relationship between the data demodulation reference signal ports. For a specific process, refer to the related description in step 101. Details are not described herein again.

In more specific examples, generally, when one base station (non-high frequency base station) allocates a plurality of data demodulation reference signal ports to the UE, these data demodulation reference signal ports usually all meet a QCL assumption. Therefore, the measurement and determining may be simplified as performing measurement and determining on any data demodulation reference signal port allocated by any base station to the UE and any data demodulation reference signal port allocated by another base station to the UE.

Example 1

In a coordinated multipoint transmission/reception system, two base stations simultaneously serve UE, and each base station allocates two data demodulation reference signal ports to the UE. ABS 1 allocates a port 0 and a port 1, and a BS 2 allocates a port 2 and a port 3. When two data demodulation reference signal ports of a same base station meet the QCL assumption, only whether any port (for example, the port 0) allocated by the BS 1 and any port (for example, the port 2) allocated by the BS 2 have similar large-scale properties (delay spread, Doppler frequency shift/spread, and average power) needs to be determined.

Example 2

In a coordinated multipoint transmission/reception system, three base stations simultaneously serve UE, and each base station allocates two data demodulation reference signal ports to the UE. ABS 1 allocates a port 0 and a port 1, a BS 2 allocates a port 2 and a port 3, and a BS 3 allocates a port 4 and a port 5. In this case, whether any port allocated by the BS 1 and any port allocated by the BS 2 have similar large-scale properties, whether any port allocated by the BS 1 and any port allocated by the BS 3 have similar large-scale properties, and whether any port allocated by the BS 2 and any port allocated by the BS 3 have similar large-scale properties need to be separately determined.

202. Indicate the obtained relationship between the data demodulation reference signal ports to the UE by using explicit signaling. Information carried in the explicit signaling includes but is not limited to indexes of the data demodulation reference signal ports allocated to the UE, the particular relationship between the ports, and related information of PDSCH mapping (mapping) corresponding to the data demodulation reference signal ports. Each base station has a data demodulation reference signal port and corresponding PDSCH mapping. In a specific example, extended DCI or enhanced DCI is provided to indicate the obtained relationship between the data demodulation reference signal ports.

Optionally, a DCI extension solution is as follows: A new indication field of several bits is added to DCI, to indicate the particular relationship between the data demodulation reference signal ports. A quantity of bits of the indication field is related to a total quantity of the ports.

In the example 1 in step 201, referring to Table 1, a QCL/non-QCL relationship between the four data demodulation reference signal ports can be indicated by using one bit. A plurality of ports of each base station meet the QCL assumption by default. In Table 1, 0 is used to indicate that the four ports of the two base stations all meet the QCL assumption, and 1 is used to indicate that the ports of the base stations BS 1 and BS 2 do not meet the QCL assumption.
t

TABLE 1

| Indication bit | BS 1 | BS 2 | Relationship |
|---|---|---|---|
| 0 | 0/1 port | 2/3 port | QCL |
| 1 | 0/1 port | 2/3 port | Non-QCL |

In the example 2 in step 201, the three base stations serve the UE in the system, referring to Table 2, a QCL/non-QCL relationship between the six data demodulation reference signal ports needs to be indicated by using three bits. In Table 2, a plurality of data demodulation reference signal ports of each base station also meet the QCL assumption by default. Values of different bits indicate particular relationships between data demodulation reference signal ports of different base stations.

TABLE 2

| Indication bits | BS 1 | BS 2 | BS 3 | Relationship |
|---|---|---|---|---|
| 000 | 0/1 port | 2/3 port | 4/5 port | All ports QCL |
| 001 | 0/1 port | 2/3 port | 4/5 port | BS 1/BS 2 QCL |
| 010 | 0/1 port | 2/3 port | 4/5 port | BS 1/BS 3 QCL |
| 011 | 0/1 port | 2/3 port | 4/5 port | BS 2/BS 3 QCL |
| 100 | 0/1 port | 2/3 port | 4/5 port | Non QCL |

Optionally, a DCI enhancement solution is as follows: An indication of whether the data demodulation reference signal (for example, DMRS) ports meet the QCL assumption, or in other words, the particular relationship between the ports, is added to a PDSCH-mapping-and-quasi-co-location indicator parameter in original DCI 2D. Specifically, an original parameter set corresponding to the indication includes:
'Number of CRS antenna ports for PDSCH RE mapping';
'CRS frequency shift for PDSCH RE mapping';
'MBSFN subframe configuration for PDSCH RE mapping';
'Zero-power CSI-RS resource configuration for PDSCH RE mapping';
'PDSCH starting position for PDSCH RE mapping'; and
'CSI-RS resource configuration identity for PDSCH RE mapping'.

In this implementation, in addition to the foregoing parameters, the parameter set corresponding to the indication further includes 'indexes of DMRS antenna ports for PDSCH RE mapping'.

The related information of PDSCH mapping is, for example, CRS or CSI-RS mapping, or a PDSCH starting point. The 'indexes of DMRS antenna ports for PDSCH RE mapping' is used to indicate indexes of DMRS ports that are in a current parameter list and that meet the QCL assumption. A person skilled in the art knows that the foregoing parameter names are merely examples, and in future standards, there may be another parameter name used to indicate the indexes of the data demodulation reference signal ports that meet the particular port relationship.

Different sent values indicating "PDSCH-mapping-and-quasi-co-location indicator" correspond to different parameter sets. After receiving the indication, the UE obtains corresponding DMRS port information based on a parameter set corresponding to a value of the indication. If the 'indexes of DMRS antenna ports for PDSCH RE mapping' includes a plurality of indexes, DMRS ports indicated by these indexes are DMRS ports meeting the QCL assumption.

203. The UE performs subsequent processing based on the received indication of the particular relationship between the data demodulation reference signal ports.

For the data demodulation reference signal ports (for example, a QCL DMRS group) that meet the particular relationship, the UE separately performs channel estimation, frequency offset estimation, and demodulation by using same channel estimation, frequency offset estimation, and demodulation parameters.

For data demodulation reference signal ports (for example, a Non-QCL DMRS group) that do not meet the particular relationship, the UE separately obtains respective parameters of the data demodulation reference signal ports, and separately performs channel estimation, frequency offset estimation, and demodulation based on respective algorithms of the data demodulation reference signal ports. Referring to step 102, execution details are not described again.

In this embodiment, the network side device determines whether the data demodulation reference signal ports allocated to the specified UE meet the QCL assumption, and sends the indication of the particular relationship between the ports by using explicit signaling. A UE side performs receive-end estimation and demodulation in groups based on the received indication of the particular relationship between the ports. When data demodulation reference signal ports allocated by different transmission points meet the QCL relationship, the UE side may perform, by using information about another port, estimation and demodulation on channels corresponding to the ports meeting the condition. In this way, it is ensured that more precise channel estimation is performed for all the data demodulation reference signal ports, thereby improving data demodulation precision and effectively reducing estimation and demodulation complexity of the UE side.

Implementation 2

Figure 5:
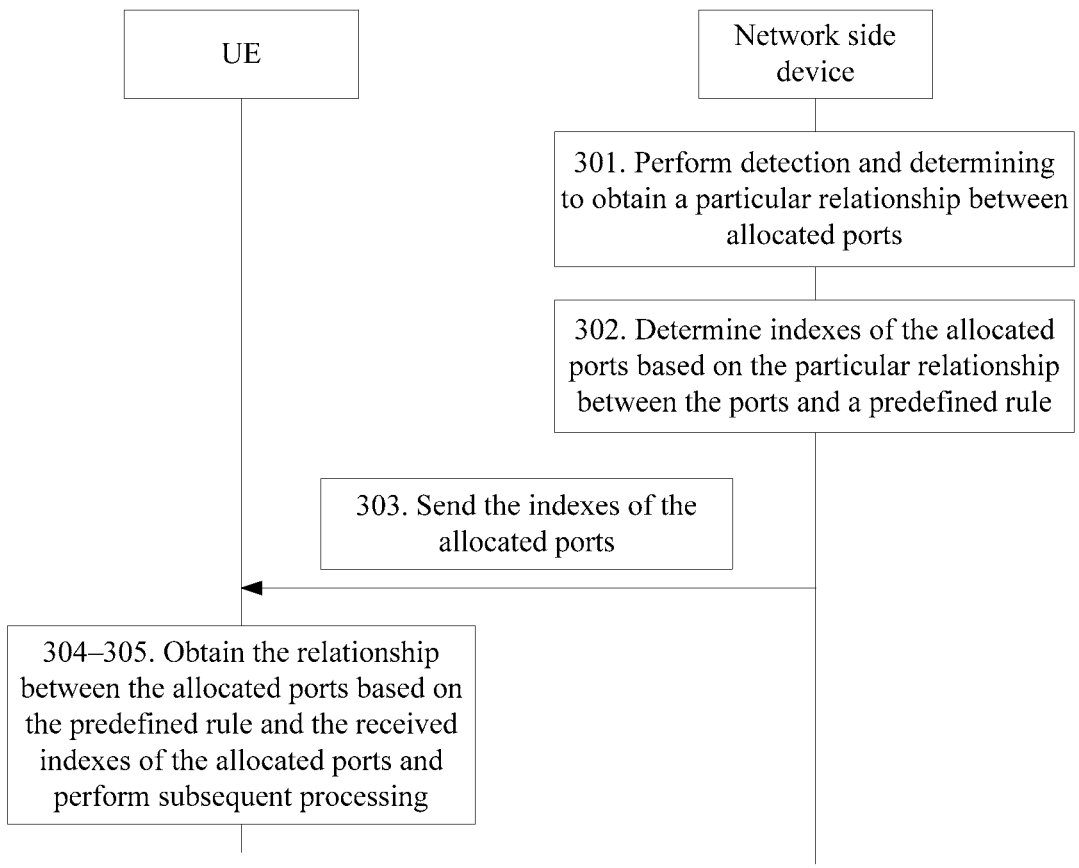

Referring to FIG. 5, in this implementation of the present invention, in a MIMO transmission system, UE obtains information about a particular relationship between data demodulation reference signal ports (in other words, information about whether a QCL assumption is met) based on an implicit signaling indication, and performs channel estimation and data demodulation based on the information. The following steps are included

301. A network side device performs, in a scheduled time-frequency resource, measurement and determining on a plurality of data demodulation reference signal ports allocated by one or more base stations to UE, to obtain information about a particular relationship (a QCL assumption for short) between these data demodulation reference signal ports. For a specific measurement and determining process, refer to the description in step 201. Details are not described herein again.

302. Determine indexes of the allocated data demodulation reference signal ports based on a predefined (predefined) rule related to the particular relationship between the ports and a determining result. The rule related to the particular relationship between the ports is known to a network side (for example, a base station) and the UE by using a stipulation in a communications protocol or through information exchange performed in advance.

For example, the rule related to the particular relationship between the ports may be set as that ports corresponding to a same time-frequency resource meet the QCL assumption, and ports corresponding to different time-frequency resources do not meet the QCL assumption. A DMRS pattern stipulated in LTE is used as an example. Some port sets (port set) in the DMRS pattern are port groups that meet the QCL assumption, and some other different port sets are port groups that do not meet the QCL assumption (Non-QCL groups for short). In this implementation, the network side device sets indexes of the detected DMRS ports that meet the QCL assumption to those port indexes in the DMRS pattern in the foregoing rule.

303. Send index information of the allocated data demodulation reference signal ports, so that the UE obtains the information about the particular relationship between the data demodulation reference signal ports. In this implementation, no additional signaling is required to indicate the particular relationship between the ports, and the UE can obtain, by using the rule related to the particular relationship between the ports, the relationship between the data demodulation reference signal ports allocated to the UE.

With reference to the foregoing example, the DMRS pattern includes a resource mapping rule and a port mapping rule of demodulation reference signals, including a location of a time-frequency resource onto which each port is mapped and a multiplexing manner for each port. For example, in the DMRS pattern stipulated in LTE, ports 7, 8, 11, and 13 are mapped onto a same time-frequency resource, and ports 9, 10, 12, and 14 are mapped onto another same time-frequency resource. The DMRS pattern is used as an example, a rule of a particular relationship between the ports is as follows: {7, 8, 11, 13} and {9, 10, 12, 14} in the DMRS pattern are port groups that meet the QCL assumption, while another port group is a port group that does not meet the QCL assumption. A person skilled in the art may understand that there may be many other patterns in future technical standards or protocols. Content of a specific pattern is not limited in this specification.

304. When receiving information about the ports allocated to the UE, the UE may obtain the information about the particular relationship between the ports allocated to the UE (whether the QCL assumption is met).

305. The UE performs subsequent processing based on an obtained indication of the particular relationship between the data demodulation reference signal ports. This step is similar to step 203, and details are not described herein again.

In this embodiment, the network side determines or obtains the particular relationship between the data demodulation reference signal ports allocated to the particular UE, delivers the particular relationship between the ports by using implicit signaling, and sends the indication of the particular relationship between the ports to the UE by using the port mapping rule. The UE side performs receive-end estimation and demodulation based on the indicated particular relationship (grouping information) between the ports by using the received implicit signaling, so that it is ensured that more precise channel estimation is performed for the data demodulation reference signal ports, thereby improving data demodulation precision and effectively reducing estimation and demodulation complexity of the UE side.

Implementation 3

Figure 6:
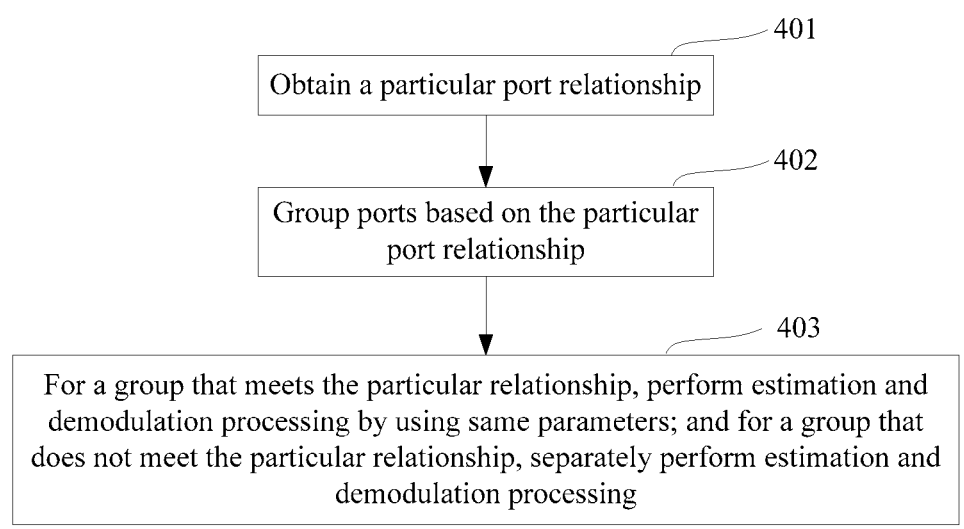

In this implementation, as described below, in a MIMO transmission system, UE obtains a particular relationship between data demodulation reference signal ports, and performs separate channel estimation and data demodulation based on the information. Referring to FIG. 6, a processing manner is as follows.

401. The UE performs, in a scheduled time-frequency resource, measurement and determining on one or more data demodulation reference signal ports allocated by a plurality of base stations to the UE, to obtain information about a particular relationship (a QCL assumption for short) between these data demodulation reference signal ports.

For a specific measurement and determining process, refer to the description in step 201. Details are not described herein again.

402. The UE groups, based on a QCL determining result, the one or more data demodulation reference signal ports allocated by the plurality of different base stations to the UE in the current scheduled time-frequency resource 403. For any group that meets the QCL assumption, the UE generates equivalent channel estimation and data demodulation parameters such as average delay spread, Doppler frequency shift/spread, and average power based on information about any port in the group.

For any group that does not meet the QCL assumption, the UE separately performs equivalent channel estimation and data demodulation on ports in the group based on the generated parameters.

In this embodiment, the UE groups the data demodulation reference signal ports allocated to the UE, and performs receive-end estimation and demodulation, so that it is ensured that more precise channel estimation is performed for all the data demodulation reference signal ports, thereby improving data demodulation precision and effectively reducing estimation and demodulation complexity of the UE side.

Correspondingly, implementations of the present invention further provide apparatuses that can be configured to perform some or all steps in the foregoing methods.

Benefits of this implementation of the present invention include at least the following:

In a same time-frequency scheduling unit, when a plurality of transmission points (TRP, transmission point) or a plurality of beams simultaneously serve UE, a spatial degree of freedom is greatly increased in a spatial multiplexing manner, so that spectrum efficiency of a system is greatly improved. The plurality of transmission points or the plurality of beams send data demodulation reference signals and PDSCHs in a same time-frequency resource by using a plurality of ports. After this implementation of the present invention is applied, regardless of whether ports allocated to the UE meet a QCL assumption, estimation and demodulation can be smoothly performed. Therefore, the coordinated multipoint spatial multiplexing manner greatly improves the spectrum efficiency of the system, to meet a large-capacity requirement of 5G New Radio (NR).

When the plurality of allocated data demodulation reference signal ports meet the QCL assumption, the UE side can perform, by using information about another port, estimation and demodulation on channels corresponding to the ports meeting the condition, so that it is ensured that more precise channel estimation is performed for all the DMRS ports, thereby improving data demodulation precision and effectively reducing channel estimation and demodulation complexity of the UE side.

Implementation 4

In this implementation of the present invention, correspondingly, an information processing apparatus configured to perform the method in the foregoing implementation is provided.

Figure 7:
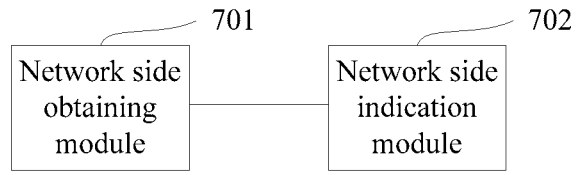
FIG. 7 is a simplified schematic diagram of an information processing apparatus according to an implementation of the present invention.

Referring to FIG. 7, an information processing apparatus 700 is applied to a network side device in a coordinated multipoint transmission/reception communications system. Each of a plurality of different base stations allocates one or more DMRS ports to UE. The apparatus includes:

a network side obtaining module 701, configured to obtain, in a scheduled time-frequency resource, information about whether a plurality of data demodulation reference signal ports allocated to the UE meet a particular port relationship, where meeting the particular port relationship means that signals sent by using any ports experience same or similar large-scale properties; and a network side indication module 702, configured to send an indication of the information about whether the particular port relationship is met, so that for at least two data demodulation reference signal ports that meet the particular port relationship, the UE performs channel estimation, frequency offset estimation, or demodulation by using same parameters.

Optionally, the network side obtaining module is configured to perform, in the scheduled time-frequency resource, measurement and determining on the plurality of data demodulation reference signal ports allocated to the UE, to obtain the information about whether the plurality of allocated data demodulation reference signal ports meet the particular port relationship. For a working principle and process of the network side obtaining module, refer to the foregoing method. Details are not described herein again.

Optionally, the network side indication module is configured to implicitly or explicitly send the indication of the information about whether the particular port relationship is met. For a working principle and process of the network side indication module, refer to the foregoing method. Details are not described herein again.

The information processing apparatus 700 shown in FIG. 7 may alternatively be implemented as including a memory that stores a computer executable instruction, and a processor. When executing the computer executable instruction, the processor may implement the information processing method described with reference to FIG. 2 to FIG. 6.

A person skilled in the art knows that, in this implementation, a network side device such as a base station, a virtual central node, or another network device that includes the foregoing apparatus is further correspondingly provided.

Figure 8:
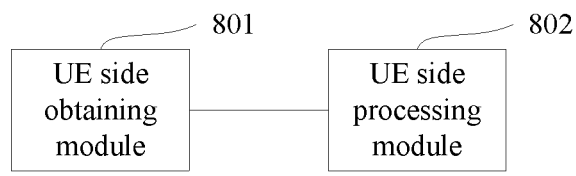
FIG. 8 is a simplified schematic diagram of another information processing apparatus according to an implementation of the present invention.

Correspondingly, referring to FIG. 8, an information processing apparatus 800 is provided, applied to a UE side in a coordinated multipoint transmission/reception communications system. Each of a plurality of different base stations in the coordinated multipoint transmission/reception communications system allocates one or more data demodulation reference signal ports to the UE. The apparatus includes:

a UE side obtaining module 801, configured to obtain, in a scheduled time-frequency resource, information about whether the plurality of data demodulation reference signal ports allocated to the UE meet a particular port relationship, where meeting the particular port relationship means that signals sent by using any ports experience same or similar large-scale properties; and a UE side processing module 802, configured to: for at least two data demodulation reference signal ports that meet the particular port relationship, perform channel estimation, frequency offset estimation, or demodulation by using same parameters.

Optionally, the UE side obtaining module is configured to perform, in the scheduled time-frequency resource, measurement and determining on the plurality of data demodulation reference signal ports allocated to the UE, to obtain the information about whether the plurality of allocated data demodulation reference signal ports meet the particular port relationship. For a specific working principle and process of the UE side obtaining module, refer to the foregoing method. Details are not described herein again.

Optionally, the UE side obtaining module is configured to receive an indication that is of the information about whether the particular port relationship is met and that is sent by a network side device. For a specific working principle and process of the UE side obtaining module, refer to the foregoing method. Details are not described herein again.

The information processing apparatus 800 shown in FIG. 8 may alternatively be implemented as including a memory that stores a computer executable instruction, and a processor. When executing the computer executable instruction, the processor may implement the information processing method described with reference to FIG. 2 to FIG. 6.

At least a part of each of the network side information processing apparatus 700 described with reference to FIG. 7 and the UE side information processing apparatus 800 described with reference to FIG. 8 may be implemented by a computing device.

Figure 9:
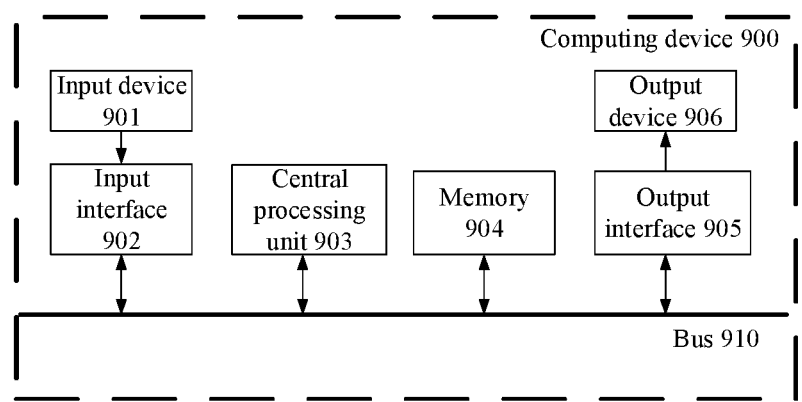
FIG. 9 is a simplified schematic diagram of a communications device according to an implementation of the present invention.

FIG. 9 is a structural diagram of an example hardware architecture of a computing device that can implement at least a part of each of a network side information processing apparatus and a UE side information processing apparatus according to embodiments of the present invention. As shown in FIG. 9, the computing device 900 includes an input device 901, an input interface 902, a central processing unit 903, a memory 904, an output interface 905, and an output device 906. The input interface 802, the central processing unit 803, the memory 804, and the output interface 805 are connected to each other by using a bus 910. The input device 801 and the output device 806 are separately connected to the bus 910 by using the input interface 802 and the output interface 805, to be connected to another component of the computing device 900. Specifically, the input device 801 receives input information from outside, and transfers the input information to the central processing unit 803 by using the input interface 802. The central processing unit 803 processes the input information based on a computer executable instruction stored in the memory 804, to generate output information, temporarily or permanently stores the output information in the memory 804, and transfers the output information to the output device 806 by using the output interface 805. The output device 806 outputs the output information to outside of the computing device 900.

It should be noted that the present invention is not limited to the particular configuration and processing described above and shown in the drawings. Moreover, detailed descriptions of known methods and technologies are omitted herein for brevity. In the foregoing embodiments, specific steps are described and shown as examples. However, the process of the method of the present invention is not limited to the specific steps described and shown, and a person skilled in the art may make various variations, modifications, and additions, or change order of steps after understanding the spirit of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present invention.

In addition, function units in the embodiments of the present invention may be integrated into one processing unit, or each of the units may exist alone physically, or two or at least two units are integrated into one unit. The integrated unit may be implemented in a form of hardware, or may be implemented in a form of a software function unit.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information processing method, applied to a multiple-input multiple-output (MIMO) communications system, wherein a plurality of data demodulation reference signal ports are allocated to a UE, and the method comprises:

obtaining, in a scheduled time-frequency resource, information about whether the plurality of data demodulation reference signal ports allocated to the UE meet a particular port relationship;

sending an indication of the information about whether the particular port relationship is met, so that for at least two data demodulation reference signal ports, of the plurality of data demodulation reference ports, that meet the particular port relationship, the UE performs channel estimation, frequency offset estimation, or demodulation by using same parameters; and for data demodulation reference signal ports that do not meet the particular port relationship, separately obtaining, by the UE, different parameters, and separately performing channel estimation, frequency offset estimation, or demodulation processes by using the different parameters, wherein meeting the particular port relationship indicates that the at least two data demodulation reference signal ports of the plurality of data demodulation reference ports are quasi co-located.

2. The method according to claim 1, wherein a network side device performs the method, and the obtaining the information about whether the plurality of data demodulation reference signal ports allocated to the UE meet the particular port relationship comprises:

performing, in the scheduled time-frequency resource, measurement and determining on the plurality of data demodulation reference signal ports allocated to the UE, to obtain the information about whether the plurality of allocated data demodulation reference signal ports meet the particular port relationship.

3. The method according to claim 2, wherein:

the sending the indication of the information about whether the particular port relationship is met comprises:

explicitly sending the indication of the information about whether the particular port relationship is met.

4. The method according to claim 1, wherein:

the sending the indication of the information about whether the particular port relationship is met comprises:

implicitly sending the indication of the information about whether the particular port relationship is met.

5. An information processing method, applied to a multiple-input multiple-output (MIMO) communications system, wherein a plurality of data demodulation reference signal ports are allocated to a UE, and the method comprises:

obtaining, in a scheduled time-frequency resource, information about whether the plurality of data demodulation reference signal ports allocated to the UE meet a particular port relationship; and for at least two data demodulation reference signal ports, of the plurality of data demodulation reference signal ports, that meet the particular port relationship, performing, by the UE, channel estimation, frequency offset estimation, or demodulation by using same parameters, and for data demodulation reference signal ports of the plurality of data demodulation reference signal ports that do not meet the port relationship, separately obtaining, by the UE, parameters and performing, by the UE, channel estimation, frequency offset estimation, or demodulation by using different parameters, wherein meeting the particular port relationship indicates that the at least two data demodulation reference signal ports of the plurality of data demodulation reference ports are quasi co-located.

6. The method according to claim 5, wherein the obtaining information about whether the plurality of data demodulation reference signal ports allocated to the UE meets the particular port relationship comprises:
performing, by the UE, in the scheduled time-frequency resource, measurement and determining on the plurality of data demodulation reference signal ports allocated to the UE to obtain the information about whether the plurality of allocated data demodulation reference signal ports meet the particular port relationship.

7. The method according to claim 6, wherein the plurality of data demodulation reference signal ports allocated to the UE comprise a first portion of data demodulation reference signal ports allocated to the UE from a first network side device and a second portion of data demodulation reference signal ports allocated to the UE from a second network side device.

8. The method according to claim 7, wherein a geographic location of the first network side device is different from a geographic location of the second network side device.

9. The method according to claim 7, wherein a geographic location of the first network side device and a geographic location of the second network side device are a same geographic location.

10. The method according to claim 5, wherein the obtaining information about whether the plurality of data demodulation reference signal ports allocated to the UE meets the particular port relationship comprises:
receiving, by the UE, an indication of the information about whether the particular port relationship is met from a network side device.

11. The method according to claim 10, wherein the receiving, by the UE, the indication of the information about whether the particular port relationship is met from the network side device comprises:
receiving, by the UE, a first indication of the information about whether the particular port relationship is met from a first network side device; and
receiving, by the UE, a second indication of the information about whether the particular port relationship is met from a second network side device.

12. The method according to claim 5, wherein the particular port relationship is that the plurality of data demodulation reference signal ports are quasi co-located.

13. An information processing apparatus, applied to a multiple-input multiple-output (MIMO) communications system, wherein a plurality of data demodulation reference signal ports are allocated to a user equipment (UE) in the MIMO communication system, and the apparatus comprises:
a processor: and
a memory storing instructions that when executed by the processor, configure the processor to:
obtain, in a scheduled time-frequency resource, information about whether the plurality of data demodulation reference signal ports allocated to the UE meet a particular port relationship, wherein meeting the particular port relationship means that signals sent by using any ports experience same or similar large-scale properties; and
send an indication of the information about whether the particular port relationship is met, so that for at least two data demodulation reference signal ports, of the plurality of data demodulation reference signal ports, that meet the particular port relationship, the UE performs channel estimation, frequency offset estimation, or demodulation by using same parameters; and
for data demodulation reference signal ports that do not meet the particular port relationship, separately obtain, by the UE, different parameters, and separately performing channel estimation, frequency offset estimation, or demodulation processes by using the different parameters,
wherein meeting the particular port relationship indicates that the at least two data demodulation reference signal ports of the plurality of data demodulation reference ports are quasi co-located.

14. The apparatus according to claim 13, wherein the memory stores further instructions that when executed by the processor, configure the processor to perform, in the scheduled time-frequency resource, measurement and determining on the plurality of data demodulation reference signal ports allocated to the UE, to obtain the information about whether the plurality of allocated data demodulation reference signal ports meet the particular port relationship.

15. The apparatus according to claim 14, wherein
the memory stores further instructions that when executed by the processor, configure the processor to implicitly send the indication of the information about whether the particular port relationship is met.

16. The apparatus according to claim 14, wherein
the memory stores further instructions that when executed by the processor, configure the processor to explicitly send the indication of the information about whether the particular port relationship is met.

17. An information processing apparatus, applied to a multiple-input multiple-output (MIMO) communications system, wherein a plurality of data demodulation reference signal ports are allocated to a UE in the MIMO communications system, and the apparatus comprises:
a processor; and
a memory that stores instructions that when executed by the processor, configure the processor to:
obtain, in a scheduled time-frequency resource, information about whether the plurality of data demodulation reference signal ports allocated to the UE meet a particular port relationship, wherein meeting the particular port relationship means that signals sent by using any ports experience same or similar large-scale properties; and
for at least two data demodulation reference signal ports, of the plurality of data demodulation reference signal ports, that meet the particular port relationship, perform channel estimation, frequency offset estimation, or demodulation by using same parameters, and for data demodulation reference signal ports of the plurality of data demodulation reference signal ports that do not meet the port relationship, separately obtaining, by the UE, parameters and performing, by the UE, channel estimation, frequency offset estimation, or demodulation by using different parameters,
wherein meeting the particular port relationship indicates that the at least two data demodulation reference signal ports of the plurality of data demodulation reference ports are quasi co-located.

18. The apparatus according to claim 17, wherein
the memory stores further instructions that when executed by the processor, configure the processor to perform, in the scheduled time-frequency resource, measurement and determining on the plurality of data demodulation reference signal ports allocated to the UE, to obtain the information about whether the plurality of allocated data demodulation reference signal ports meet the particular port relationship.

19. The apparatus according to claim 17, wherein the memory stores further instructions that when executed by the processor, configure the processor to receive an indication that is of the information about whether the particular port relationship is met and that is sent by a network side device.

* * * * *